June 17, 1952  L. H. MORIN  2,600,905
BOX AND PIN SEPARATOR FOR SEPARABLE FASTENER STRINGERS
Filed Jan. 7, 1948
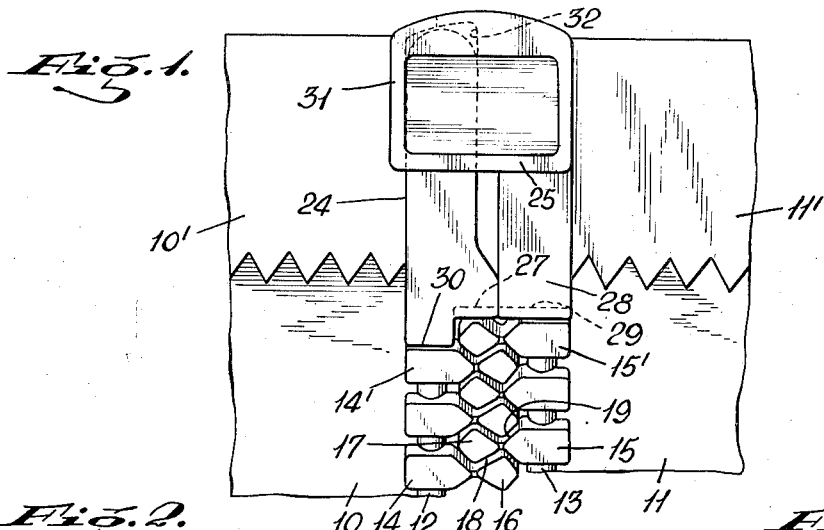
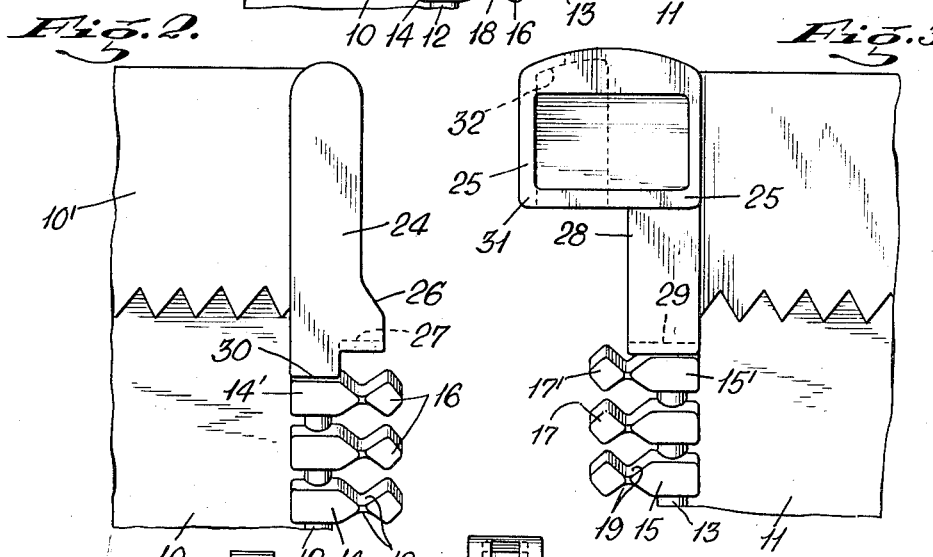
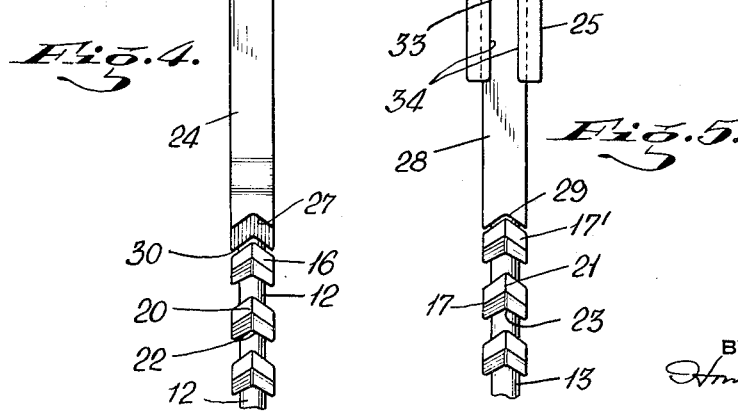
INVENTOR
LOUIS H. MORIN
BY
ATTORNEY Patented June 17, 1952

2,600,905

UNITED STATES PATENT OFFICE 2,600,905

BOX AND PIN SEPARATOR FOR SEPARABLE FASTENER STRINGERS

Louis H. Morin, Bronx, N. Y.

Application January 7, 1948, Serial No. 859

6 Claims. (Cl. 24—205.11)

This invention relates to separable fastener stringers employing box and pin couplings at one end thereof, particularly in fastener stringers as are applied to articles requiring complete separation with respect to each other. More particularly, the invention deals with box and pin constructions wherein the pin part, as well as the bar member of the box part are provided with means engaging end scoops of the stringers and with means on the pin part engaging the end scoop of the opposed stringer in more securely retaining the stringers against separation, particularly when subjected to flexure adjacent the pin and box parts.

The novel features of the invention will be best understood from the following description when taken together with the accompanying drawing, in which certain embodiments of the invention are disclosed, and in which the separate parts are designated by suitable reference characters in each of the views, and in which:

Fig. 1 is a plan view of one end portion of a pair of stringers coupled together by one of my improved couplings.

Figs. 2 and 3 are views similar to Fig. 1, showing the stringer parts detached.

Fig. 4 is an edge view of the structure as shown in Fig. 2; and

Fig. 5 is an edge view of the structure as seen in Fig. 3.

In fasteners of the type and kind under consideration, difficulties have been experienced in the construction of pin and box part couplings at common ends of stringers or a pair of stringers, particularly with respect to separation of coupled stringers adjacent the pin and box parts. Efforts have been made to overcome this by forming scoop or link elements as part of the pin or box parts, but even in such cases, the same difficulties have been experienced.

It is the purpose of my invention to provide a pin and box part coupling for use in conjunction with links or scoops of V-cross-sectional form, wherein the pin part and the bar member of the box part have V-shaped recesses to engage and interlock with the end links or scoops of the stringers to which said parts are attached. Still further, I provide the pin part with an extension having a V-shaped recess for reception of the coupling head on the end link of the companion stringer to further interlock and couple the stringers against any possible bend-over separation adjacent the pin and box parts of the stringers.

In the drawing, I have shown at 10 and 11, one end portion of two separable fastener stringers having beaded edges as at 12 and 13 respectively. To the beaded edges are attached, at spaced intervals, links or scoops 14 and 15. These scoops are of the construction shown in side elevation in Figs. 2 and 3, having heads which are substantially diamond-shaped in cross-section, as at 16 and 17, inwardly of which the scoops have on upper and lower surfaces, grooves or recesses 18 and 19 for reception of the heads of companion stringers, in the manner clearly illustrated in Fig. 1. The scoops or links are further of the V-shaped form, clearly shown in Figs. 4 and 5 of the drawing. In other words, centrally and longitudinally of the upper edges of the scoops are ribs or ridges 20 and 21, with corresponding recesses 22 and 23 on the undersurface thereof, the latter receiving the ridges of the scoops of companion stringers.

The tapes of the stringers have at one of their ends, inturned portions, as seen at 10'—11' and to these portions and the beaded edges 12 and 13 are attached the pin and box coupling parts 24 and 25 of the two stringers. The pin part has at its inner end, an offset projection 26, the lower surface of which has a V-shaped recess 27 which is adapted to receive the head 17' of the end scoop 15' of the companion stringer, the projection 26 abutting the pin or bar portion 28 of the box part 25 when the parts are coupled together, as seen in Fig. 1 of the drawing. The pin or bar portion 28 has at its inner surface a V-shaped recess 29, similar to the recess 27, and adapted to receive part of the end scoop 15', as will clearly appear from a consideration of Fig. 1 of the drawing, thus providing a close nesting of the end scoop 15' with the pin and box parts. It will also appear that the pin part 24 has a V-shaped recess 30 partially receiving the end scoop 14' of the stringer 10.

The box part has an enlarged head or box portion 31, within which is arranged a socket or recess 32 to receive the pin part 24 in assemblage of the parts. The socket or recess 32 opens through the side edge of the part 31, as seen at 33 in Fig. 5, for reception of the tape 10—10'. Flanges 34 bordering the recess 33 engage the pin part in holding the parts against lateral separation. When the pin and box parts are coupled together and the fastener stringers united, they assume the position as seen in Fig. 1 of the drawing. Then as the usual slider (not shown) is moved in the direction of the box part, in separating the stringers, the pin part can be removed through the slider in the very well known manner when the slider abuts the enlarged box portion 31 of the box part.

In reassembling the stringers, the pin part is inserted through the slider into the recess 32, and the slider is then moved in the opposite direction to again couple the stringers. By providing the interlocking or intercoupling of the pin part and the bar of the box part with the end links or scoops, as stated, these end links or scoops are adapted to flex, to compensate for bending, while at the same time, maintaining an interlocking engagement with said parts, thus separation is obviated. The parts are not free to flex one with respect to the other by virtue of the coupling engagement between the parts, except to the extent checked by the limited clearance provided between the parts.

It will be apparent that with my improved construction, the pin and box part form what may be termed end stop couplings at one end of the stringers, and these couplings or coupling parts at the beaded edge of the stringers have portions snugly interlocking and interfitting with corresponding portions adjacent end links or scoops. A further inter-engagement is provided between the protruding head of the scoop of one stringer and the stop or coupling part of the other stringer by similar interfitting, interlocking portions. In the present construction, the showing may be said to be in an inverted position, particularly when the articles to which the stringers are attached are in the form of garments wherein the pin and box parts are usually employed at the base or lower end of the garment. In this sense, the term V-shaped cross-sectional form is properly used in defining the scoop shape, whereas as seen in the drawing, the contour would be inverted V.

Having fully described my invention, what I claim as new, and desire to secure by Letters Patent is:

1. In a separable fastener assembly comprising stringers including interlocking fastener elements having body and head portions and of V-shaped cross-section throughout their length providing a ridge extending longitudinally of one face and a corresponding valley extending longitudinally of the other face of each element, the improvement which comprises: a box part secured to one stringer end having a V-shaped recess for receiving the ridge of the body portion of the adjacent scoop of such stringer; a pin part secured to the other stringer having a recess alined with the first-mentioned recess and V-shaped to receive the ridge of the head portion of the said adjacent scoop of the first-mentioned stringer; and said pin part having a second V-shaped recess positioned to receive the ridge of the body portion of the adjacent scoop of the stringer to which the said pin part is attached.

2. In a pair of separable fastener stringers having scoops of V-shaped cross section throughout the length thereof, outer protruding ends of the scoops having heads of diamond-shaped profile, the combination therewith of separator couplings at one end of the stringers for coupling and uncoupling the stringers independently of said scoops, said couplings each engaging an end scoop of a stringer and each having a V-shaped recess in the engaging end thereof for receiving said V-shaped end scoop, and the coupling of one stringer having another V-shaped recess beyond the stringer edge and spaced from said first recess therein for receiving the V-shaped head of the end scoop of the companion stringer.

3. In a pair of separable fastener stringers having scoops spaced longitudinally of beaded edges thereof, the combination therewith of a stop coupling at one end of each stringer arranged upon said beaded edge adjacent the end scoop of the stringer, said stop couplings being interengageable, and each said stop coupling and its adjacent end scoop having interengaging socket and projection portions for maintaining engagement between the stop couplings and the scoops during flexure of the coupled stringers.

4. In a pair of separable fastener stringers having scoops spaced longitudinally of beaded edges thereof with heads projecting beyond said beaded edges, the combination therewith of a stop coupling at one end of each stringer arranged upon said beaded edge in engaging relation with the end scoop of the stringer, said stop couplings being interengageable, each said stop coupling and its engaging end scoop having interengaging socket and projection portions for maintaining engagement between the stop couplings and the scoops during flexure of the coupled stringers, and one stop coupling and the head of the end scoop of the companion stringer having interengaging socket and projection portions.

5. In a separable fastener assembly comprising stringers including interlocking fastener elements each having body and head portions and also having a ridge extending longitudinally of one face and a corresponding recess extending longitudinally of the other face, the improvement which comprises: a box part secured to one stringer end having a recess for receiving the ridge of the body portion of the adjacent scoop of such stringer; a pin part secured to the other stringer having a recess alined with the box part recess to receive the ridge of the head portion of the said adjacent scoop of the first-mentioned stringer; and said pin part having a second recess spaced from its first recess for receiving the ridge of the body portion of the adjacent scoop of the stringer to which the said pin part is attached.

6. In a pair of separable fastener stringers having scoop members spaced longitudinally of the edges thereof, the combination therewith of a stop coupling member arranged on an end portion of each stringer adjacent the end scoop member on each said stringer, said coupling members being interengageable, an end portion of the end scoop member of one of said stringers being engageable with the coupling member of the opposite stringer, interengaging means on said scoop member end portion and on said opposite coupling member comprising a projection on the scoop member end portion and a recessed portion on the opposite coupling member, and interengaging means on the last-mentioned end scoop member and its adjacent coupling member for preventing the displacement of said scoop member relatively to said coupling member and stringer, said last-mentioned interengaging means comprising a projection on one of said members and a recessed portion on the other of said members.

LOUIS H. MORIN.

REFERENCES CITED

The following references are of record in the file of this patent:

UNITED STATES PATENTS

| Number | Name | Date |
| --- | --- | --- |
| 2,037,473 | Legat | Apr. 14, 1936 |
| 2,093,973 | Clark | Sept. 21, 1937 |
| 2,100,557 | Wintritz | Nov. 30, 1937 |
| 2,158,079 | Miller | May 16, 1939 |
| 2,219,045 | Keissling | Oct. 22, 1940 |
| 2,395,677 | Marinsky | Feb. 26, 1946 |

FOREIGN PATENTS

| Number | Country | Date |
| --- | --- | --- |
| 504,716 | Great Britain | of 1939 |